(12) United States Patent
Iseri et al.

(10) Patent No.: US 7,420,661 B2
(45) Date of Patent: Sep. 2, 2008

(54) IMAGE DETECTION APPARATUS

(75) Inventors: Yoichi Iseri, Iizuka (JP); Yoshinori Tahara, Iizuka (JP); Shigeo Nishihara, Iizuka (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 336 days.

(21) Appl. No.: 10/999,566

(22) Filed: Nov. 30, 2004

(65) Prior Publication Data

US 2005/0157911 A1 Jul. 21, 2005

(30) Foreign Application Priority Data

Jan. 15, 2004 (JP) ............................. 2004-008501

(51) Int. Cl.
*G06K 9/74* (2006.01)
(52) U.S. Cl. ........................................ 356/71; 382/124
(58) Field of Classification Search ................... 356/71; 382/124–127
See application file for complete search history.

(56) References Cited

U.S. PATENT DOCUMENTS 4,932,776 A 6/1990 Dowling, Jr. et al.
5,942,761 A * 8/1999 Tuli ........................... 250/556
6,885,439 B2 * 4/2005 Fujieda ........................ 356/71
2001/0050765 A1 * 12/2001 Antonelli et al. .............. 356/71
2003/0215117 A1 * 11/2003 Hata ........................... 382/124
2004/0179722 A1 * 9/2004 Moritoki et al. ............. 382/124

* cited by examiner

*Primary Examiner*—Gregory J. Toatley, Jr.
*Assistant Examiner*—Juan D Valentin
(74) *Attorney, Agent, or Firm*—Ladas & Parry LLP

(57) ABSTRACT

An image detection apparatus includes an interposer, an illumination light emitting element mounted on the interposer for emitting a light toward a surface of a finger tip, an optical sensor chip mounted on the interposer, the optical sensor chip including an alignment of light receiving elements, a light guide member including a bundle of optical fiber parts, the light guide member being mounted on the optical sensor chip, the light guide member including a contact surface to which the surface of the finger tip is contacted, the contact surface being situated opposite from a surface to which the optical sensor chip is mounted, and a synthetic resin mold part being integrally formed with the interposer, the synthetic resin mold part covering the illumination light emitting element and the optical sensor chip and surrounding the light guide member.

7 Claims, 10 Drawing Sheets

MOUNT LED, RESISTANCE ELEMENT, CONDENSER CHIP

PERFORM REFLOW PROCESS

MOUNT OPTICAL SENSOR CHIP

PERFORM WIRE BONDING PROCESS

ADHERE LIGHT GUIDE MEMBER

ILLUMINATION GUIDE MEMBER

BATCH MOLD

DICE

IMAGE DETECTION APPARATUS

BACKGROUND OF THE INVENTION

1. Field of the Invention

The present invention generally relates to an image detection apparatus, and more particularly to a type of image detection apparatus having a line type optical sensor with an alignment of light receiving elements and using internal scattered light scattered inside a finger tip and emitted from a surface of the finger for obtaining a fingerprint by sliding the finger thereacross.

2. Description of the Related Art

In recent years, electronic apparatuses such as a computer, and portable communication apparatuses such a mobile phone are mounted with an image detection apparatus such as a fingerprint sensor, which identifies fingerprints on a finger for individual identification, from the aspect of security. Here, the fingerprint sensor is desired to provide a satisfactory reliability at a low manufacture cost, and to have a small size for allowing assembly to a small-sized apparatus such as a mobile communication apparatus.

As one image detection apparatus, there is an optical type fingerprint sensor. The optical type fingerprint sensor can be classified into a type which utilizes light reflected from a surface of a finger, as shown in FIG. 11(A), and another type which utilizes internal scattered light that scatters in the finger and is emitted from the surface of the finger. Numeral 1 indicates a finger including a finger tip, numeral 2 indicates a glass plate, numeral 3 indicates a light emitting diode serving as a lighting source, numeral 4 indicates an optical sensor, numeral 10 indicates a projection light, and numeral 11 indicates a reflected light reflected from a surface of a finger. Numeral 12 indicates an internal scattered light. With the type utilizing reflected light, there is a fluctuation in the quality of the obtained fingerprint image depending on whether the finger is in a moist state or a dry state. Accordingly, this type employs complicated image processing and uses a specialized processor in order to obtain an image quality for enabling fingerprint authentication. It is, therefore, difficult to reduce manufacture cost to a low cost. With the type utilizing internal scattered light, a fingerprint image of a satisfactory quality can be obtained regardless of whether the finger is in a moist or dry state. Accordingly, image processing can be simple, and a typical processor can be sufficient for this type. Therefore, manufacture cost can be reduced to a low cost. It is to be noted that the refractive index of the finger is approximately 1.5 to 1.7.

An example of a conventional fingerprint sensor of the type utilizing the internal scattered light is shown in U.S. Pat. No. 4,932,776. This fingerprint sensor, however, is of a large size, and is difficult to be assembled to a small-sized apparatus such as a portable communication apparatus. One reason causing this difficulty is that an optical source is situated at a position in a light guide member facing a surface to which a finger is contacted, and is disposed apart from the surface. Another reason is that the optical sensor chip is an area type optical sensor chip having light receiving elements aligned in a matrix form, and that the light guide member has a cross-section that corresponds to the size of a fingertip.

SUMMARY OF THE INVENTION

It is a general object of the present invention to provide an image detection apparatus that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a image detection apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an image detection apparatus including: an interposer; an illumination light emitting element mounted on the interposer for emitting a light toward a surface of a finger tip; an optical sensor chip mounted on the interposer, the optical sensor chip including an alignment of light receiving elements; a light guide member including a bundle of optical fiber parts, the light guide member being mounted on the optical sensor chip, the light guide member including a contact surface to which the surface of the finger tip is contacted, the contact surface being situated opposite from a surface to which the optical sensor chip is mounted; and a synthetic resin mold part being integrally formed with the interposer, the synthetic resin mold part covering the illumination light emitting element and the optical sensor chip and surrounding the light guide member.

In the image detection apparatus according to an embodiment of the present invention, the synthetic resin mold part may have a light blocking property.

In the image detection apparatus according to an embodiment of the present invention, the image detection apparatus may further include an illumination guide member disposed above the illumination light emitting element for guiding the emitted light to the finger tip.

In the image detection apparatus according to an embodiment of the present invention, the illumination guide member may be formed of a material having a satisfactory light transmitting property with respect to a wavelength of the emitted light of the illumination light emitting element.

In the image detection apparatus according to an embodiment of the present invention, the light guide member may be adhered to the optical sensor chip via an adhesive layer having an elastic property.

In the image detection apparatus according to an embodiment of the present invention, the interposer may include a flange part formed at a peripheral part thereof.

In the image detection apparatus according to an embodiment of the present invention, the light receiving elements of the optical sensor chip may be aligned as a straight line, wherein the illumination light emitting element may be disposed in correspondence with the alignment of the light receiving elements.

In the image detection apparatus according to an embodiment of the present invention, the synthetic resin mold part may include an inclined plane formed at a peripheral part thereof.

Other objects and further features of the present invention will be apparent from the following detailed description when read in conjunction with the accompanying drawings.

DESCRIPTION OF THE PREFERRED EMBODIMENTS

In the following, embodiments of the present invention are described with reference to the accompanying drawings.

Figure 1:
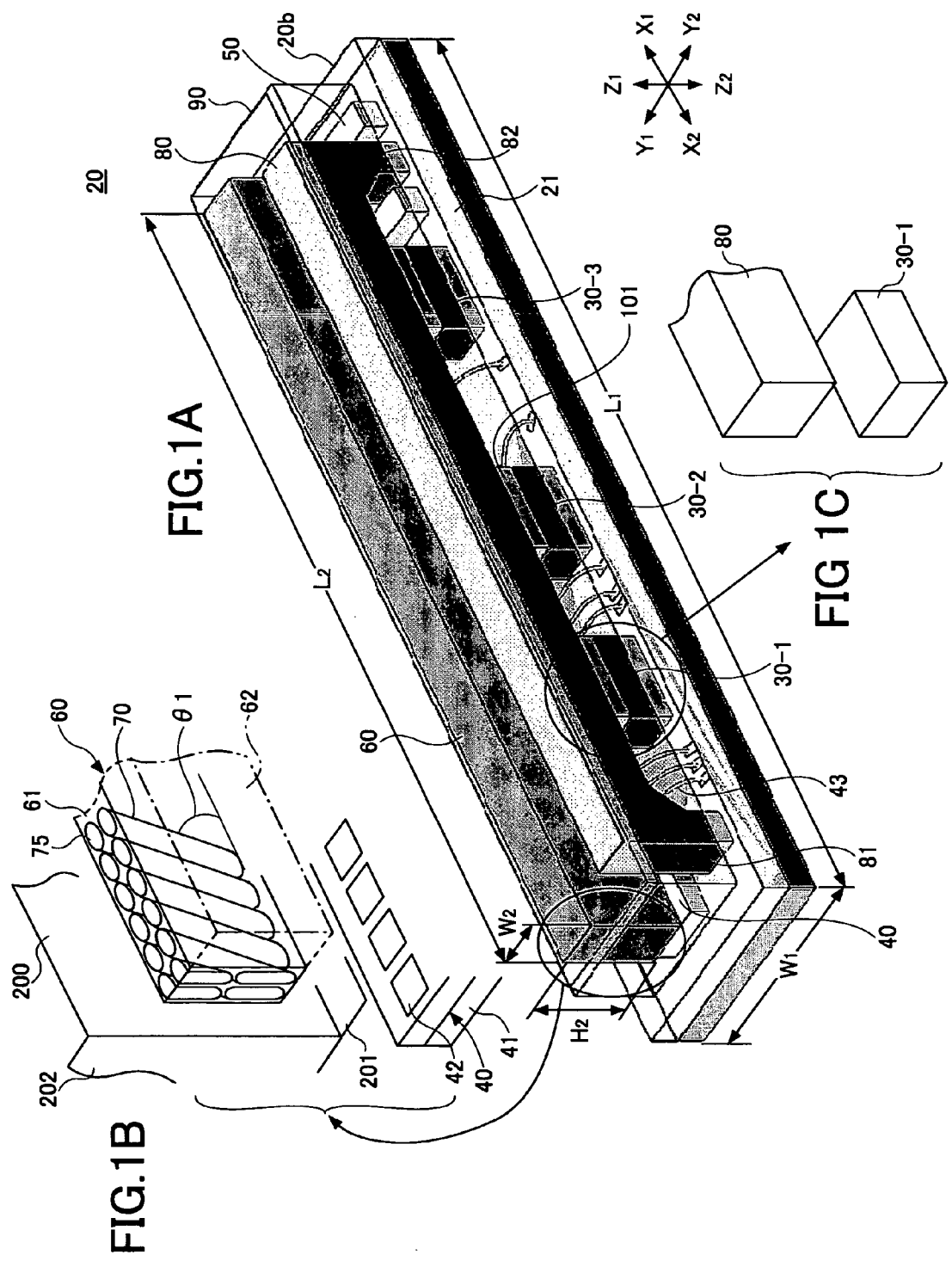
FIGS. 1A-1C is a perspective view showing a fingerprint sensor according to a first embodiment of the present invention.
Figure 2:
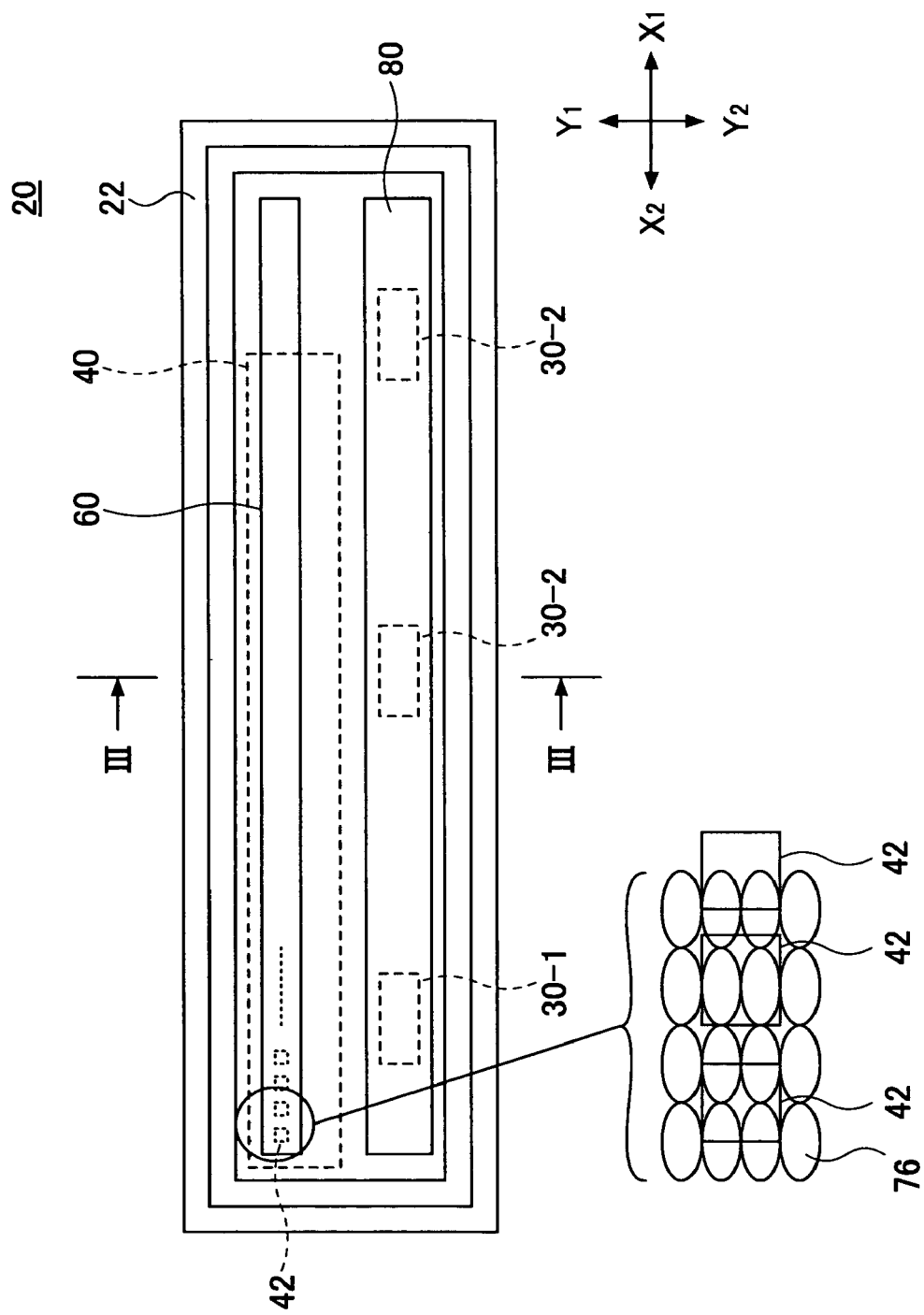
FIG. 2 is a plan view showing a fingerprint sensor of FIG. 1.
Figure 3:
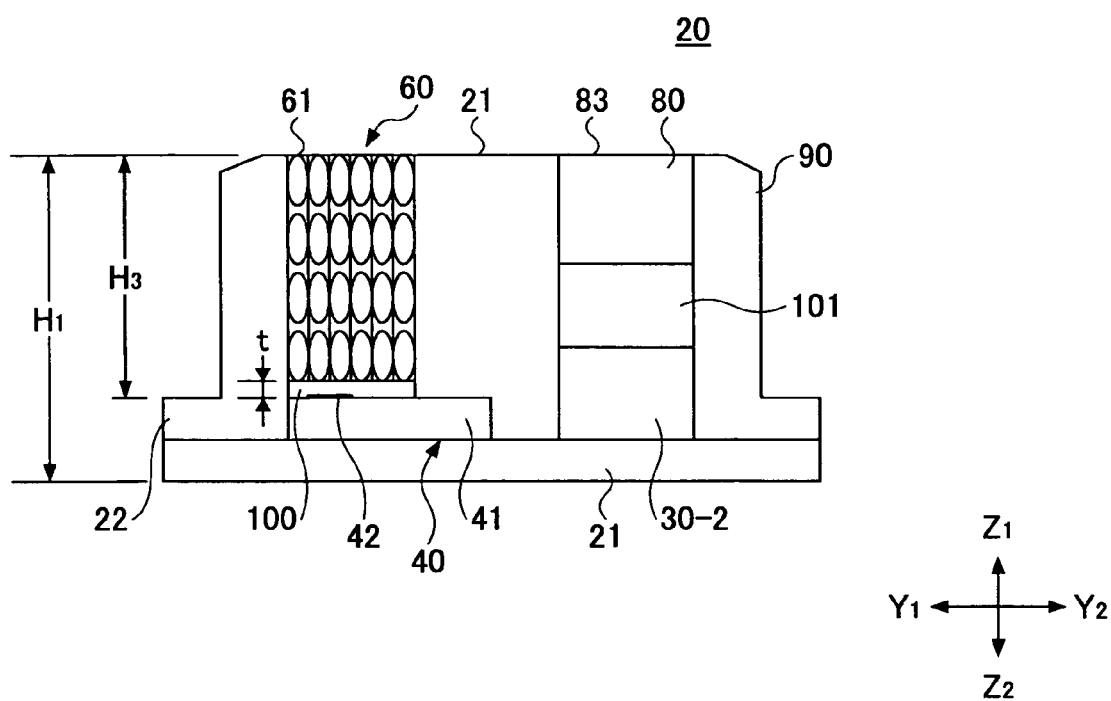
FIG. 3 is a cross-sectional view along line III-III of FIG. 2A.

FIGS. 1 to 3 show a fingerprint sensor 20 according to a first embodiment of the present invention. FIG. 1 is a perspective view, FIG. 2 is a plan view, and FIG. 3 is a cross-sectional view along line III-III in FIG. 2. FIG. 1 illustrates the fingerprint sensor 20 in a transparent manner for showing the internal structure thereof. Direction X1-X2 indicates a longitudinal direction, direction Y1-Y2 indicates a width direction, and direction Z1-Z2 indicates a thickness direction.

The fingerprint sensor 20 employs the type utilizing internal scattered light, and is configured to obtain a fingerprint by sliding a finger thereto. The fingerprint sensor 20 includes light emitting diode chips 30-1 to 30-3, an optical sensor chip 40, a condenser chip 50, a resistance element, and/or a transistor, for example, mounted on an interposer 21. Furthermore, a light guide member 60 is mounted on the optical sensor chip 40. Furthermore, an illumination guide member 80 is mounted on the light emitting diode chips 30-1 to 30-3. Furthermore, the fingerprint sensor 20 includes a synthetic resin mold part 90 covering and surrounding the light emitting diode chips 30-1 to 30-3, the optical sensor chip 40, the condenser chip 50, the resistance element, the transistor, the light guide member 60, and the illumination guide 80, to thereby form an integrated body. The fingerprint sensor 20 has a small size in which its length L1 is approximately 17 mm, its width W1 is approximately 5 mm, and its height is approximately 3 mm.

Figure 9:
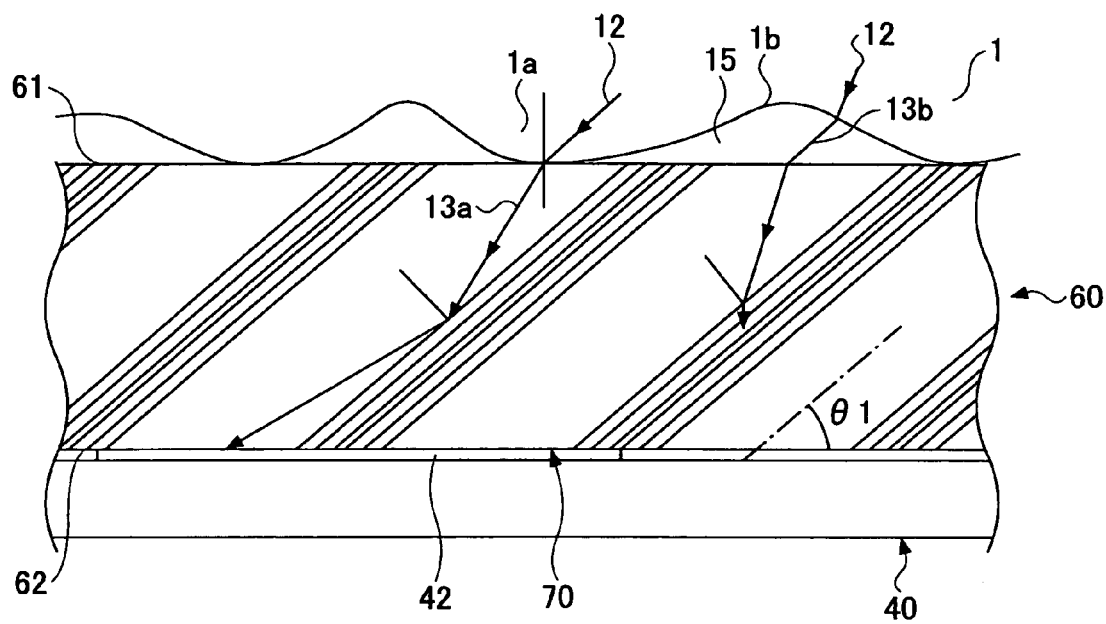
FIG. 9 is a schematic drawing showing total reflection and refraction of a light incident to a light guide member from a finger tip in a state of obtaining a fingerprint.

In the fingerprint sensor 20, when a finger (finger tip) 1 is placed on an upper surface of the light guide member 60 in a manner shown in FIG. 9, a convex part 1a of a convexo-concavo surface forming part of the fingerprint on a finger adheres to the upper surface of the light guide member 60, and a concave part 1b does not contact the upper surface of the light guide member 60, thereby forming a space layer 15 between the concave part 1b and the upper surface of the light guide member 60. Among internal scattered light 12 scattered in the finger 1, a light 13b emitted from the concave part is not totally reflected, but is absorbed in the light guide member 60, and does not reach to a light receiving element 42 of the optical sensor chip 40. A light 13a emitted from the convex part is totally reflected in the light guide member 60, and reaches to the light receiving element 42. When viewed from a light emitting side of the light guide member 60, the surface of the finger can be seen as being bright at the convex part, and dark at the concave part. Accordingly, pattern recognition of the fingerprint of the finger is executed by processing electric signal(s) from the optical sensor chip 40 where the finger 1 is slided in direction Y2.

As shown in FIGS. 1 to 3, the interposer 21 is a printed circuit with a rectangular shape having a longer side extending in direction X1-X2.

The optical sensor chip 40 includes a substrate 41 formed from an elongated material (e.g. silicon), on which numerous light receiving elements 42 (e.g. 256 light receiving elements) are aligned in a single row in a longitudinal direction of the substrate 41. The light receiving element 42 has a size of approximately 40 μm square, for example. The light receiving elements are aligned with a pitch of, for example, 43 μm, and arranged at, for example, 600 dots/inch. The number of the light receiving elements is, for example, 256 light receiving elements. The optical sensor chip 40 is mounted on the interposer 21 toward direction Y1. The light receiving elements 42 are aligned in a single row along direction X1-X2.

Here, for the sake of convenience, three perpendicularly intersecting planes is described below based on the direction of the alignment of the light receiving elements 42. In FIG. 1B, numeral 200 indicates an X-Z plane which is a perpendicular plane being perpendicular to the alignment direction of the light receiving elements 42. Numeral 201 indicates an X-Y plane which is a horizontal plane. Numeral 202 indicates a Y-Z plane which is perpendicular plane being perpendicular to the alignment direction of the light receiving elements 42.

Furthermore, the terminals on the substrate 41 and the terminals on the interposer 21 are connected by wire-bonded wires 43.

The three light emitting diode chips 30-1 to 30-3 are mounted on the interposer 21 toward direction Y2, and are aligned in direction X1-X2. The light receiving elements 42 and the light emitting diode chips 30-1 to 30-3 are disposed adjacent to each other in direction Y1-Y2, and are aligned in direction X1-X2. The light emitting diode chips 30-1 to 30-3 emit an infrared light having a wavelength of, for example, 900-1000 nm. It is to be noted that the light emitted from the light emitting diode chips 30-1 to 30-3 may alternatively be a red light having a wavelength of 600 nm or more. Light emitting diodes of a mold member may alternatively be employed as the light emitting diode chips 30-1 to 30-3.

The light guide member 60 serves to absorb incident light other than internal scattered light from the atmosphere, and internal scattered light that is incident via the space layer 15, and also serves to guide internal scattered light that is directly incident from the surface of the finger tip 1 without traveling through the space layer 15 to the light receiving elements 42. The incident light from the atmosphere, and the internal scattered light that is incident via the space layer 15 do not reach the light receiving elements 42 since such light are turned into noise. As shown in FIG. 1B, the light guide member 60 includes a bundle of optical fiber parts 70 where numerous optical fiber parts 70 are gathered and arranged therein. The light guide member 60 has a rectangular solid shape elongated in direction X1-X2, in which its length L2 is approximately 15 mm, its width W2 is approximately 1 mm, and its height H2 is approximately 2 mm. Numeral 61 indicates an upper surface of the light guide member 60, and numeral 62 indicates a lower surface of the light guide member 60. It is to be noted that the light guide member 60 is manufactured according to a process illustrated in FIG. 7 (described below).

Figure 4A:
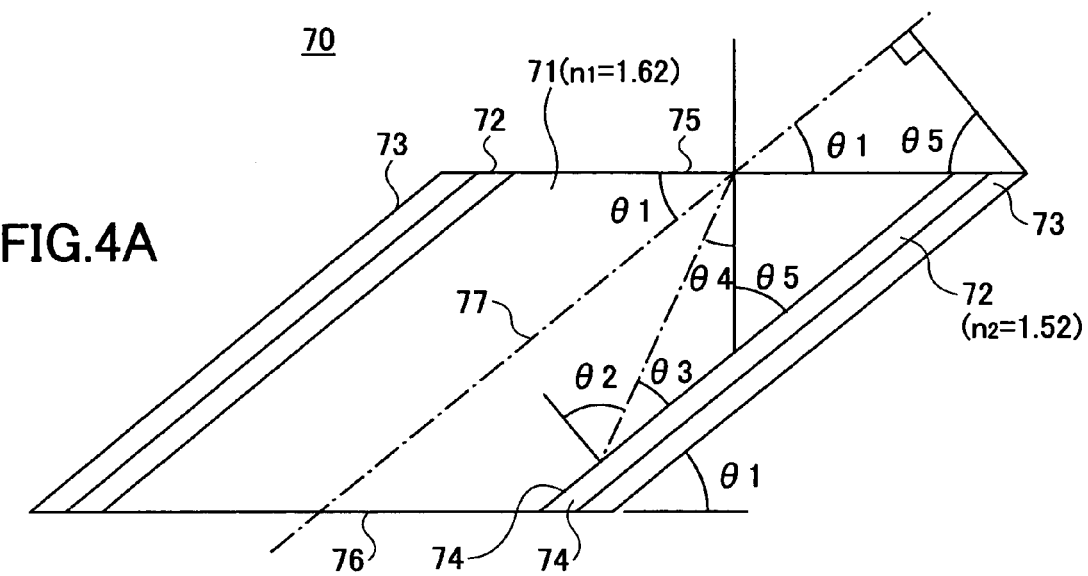
FIGS. 4A-4C is an enlarged view showing an optical fiber part of a light guide member and also reflection and refraction of light in the light guide member.
Figure 4B:
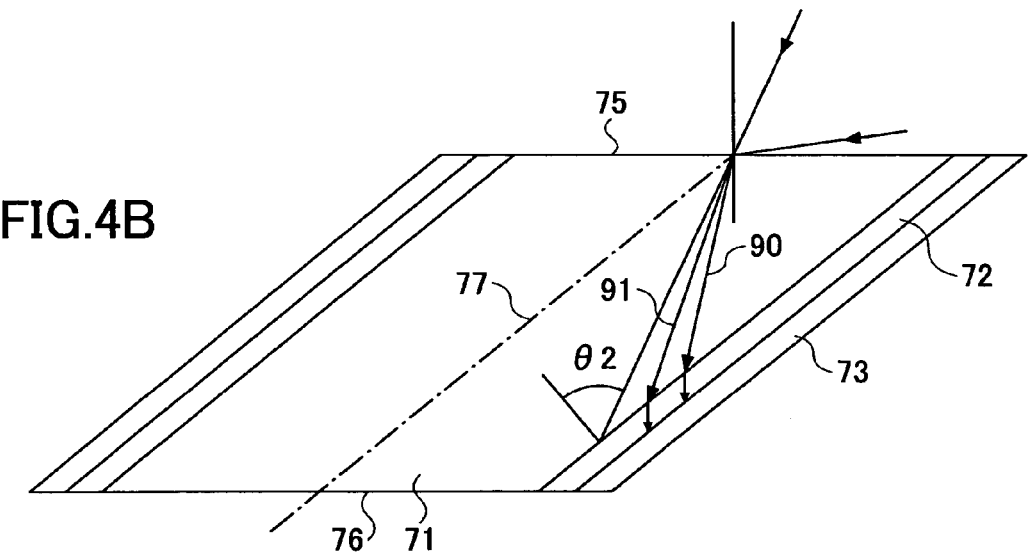
Figure 4C:
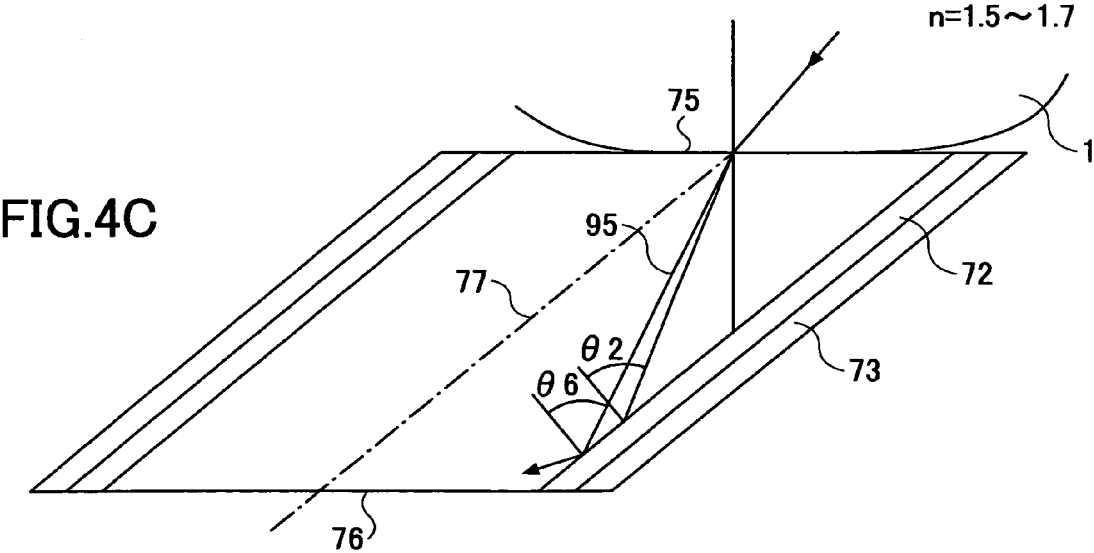

Each optical fiber part 70 situated within the plane 200, is inclined at an angle of θ1 in direction X2 with respect to the Z-axis, and is densely aligned in directions X1-X2 and Y1-Y2. The optical fiber parts 70 may alternatively be inclined in direction X1 with respect to the Z-axis. Each of the optical fiber parts 70 includes a core 71 disposed at its center, a clad 72 disposed at a periphery of the core 71, and a light absorbing layer 73 disposed at a periphery of the clad 72 (also see FIG. 4A). Further, each of the optical fiber parts 70 includes an incident plane 75 to which the finger 1 is placed and where light enters, and an outgoing plane 76 from which light exits. The core 71 has a refractive index n1 of 1.62, for example. The clad has a refractive index n2 of 1.52, for example. Furthermore, the incident plane 75 and the outgoing plane 76 are elliptically shaped elongated in direction X1-X2. Numeral 74 indicates a boundary plane between the core 71 and the clad 72. The incident plane 75 and the outgoing plane 76 are both horizontal planes. The incident plane 75 of each of the optical fiber parts 70 are gathered to form the upper surface 61 of the light guide member 60, and the outgoing plane 76 of each of the optical fiber parts 70 are gathered to form the lower surface 62 of the light guide member 60. The angle with respect to an optic axis 77 of the optical fiber part 70 in the incident plane 75 (equal to the above-described angle θ1) is determined as described below. First, as shown in FIG. 4B, the incident light entering from the atmosphere and advancing into the core 71 via the incident plane 75 is determined so that it is not totally reflected at the boundary plane 74. More specifically, it is determined that, an incident light 90 incident from a direction substantially perpendicular to the incident plane 75 is refracted at the incident plane 75, enters into the core 71, advances into the clad 72 without being totally reflected at the boundary plane 74, and is absorbed in the light absorbing layer 73. Furthermore, it is determined that, an incident light 91 incident from a direction substantially parallel to the incident plane 75 is refracted at the incident plane 75, enters into the core 71, advances into the clad 72 without being totally reflected at the boundary plane 74, and is absorbed in the light absorbing layer 73. Secondly, it is determined that, a part of the internal scattered light 95 incident from the inside of the finger tip 1 enters the core 71 via the incident plane 75 without passing through the space layer 15, to thereby become incident in an angle θ6 being larger than a critical angle θ2 (described below) with respect to the boundary plane 74, and be totally reflected thereat. The light that is totally reflected at the boundary plane 74 reaches the outgoing plane 76 and exits therefrom.

Here, the above-described angle θ1 is calculated in a case where the core 71 has a refractive index n1 of 1.62, and the clad 72 has a refractive index n2 of 1.52. In FIG. 4A, θ2 is the critical angle between the core 71 and the clad 72. In FIG. 4A, the angle θ4 is the refracted angle of a hlight from the atmosphere being incident to the incident plane 75 from a direction substantially horizontal to the incident plane 75 and entering the core 71 after being refracted at the incident plane 75. The relations between θ3, θ4, θ5, and θ1 are as follows: θ3=90−θ2, θ5=θ3+θ4, θ1=90−θ5.

The critical angle θ2 is θ2=$\sin^{-1}$ (1.52/1.62)≈70, and the angle θ4 is θ4=$\sin^{-1}$ (1/1.62)≈38. The angle θ3 is 20 degrees, the angle θ5 is 58 degrees, and the angle θ1 is approximately 32 degrees.

Therefore, theoretically, the angle θ1 is to be smaller than 32 degrees. With this embodiment, however, the angle θ1 is approximately 40 degrees. Through experimentation, it is found that an image of a fingerprint with satisfactory contrast is obtained even when the angle θ1 has angle greater than 32 degrees, for example, approximately 40 degrees. This owes to the boundary between the core 71 and the clad 72 being in a gradation state, and the diffuse reflection created in this area. It is to be noted that the angle θ1 is not limited to 40 degrees, but may alternatively be approximately 48 degrees according to experimentation. The angle θ1 may range, for example, from 38 to 48 degrees.

It is to be noted that the light guide member 60 becomes difficult to mount as the angle θ1 of the optical fiber part 70 becomes more acute. However, since the angle θ1 is approximately 40 degrees, the light guide member 60 is not difficult to mount. Furthermore, the angle θ1 of the optical fiber part 70 and the length L2 of the light guide member 60 have a relation in which the length L2 becomes shorted as the angle θ1 becomes larger. Therefore, in a case where the angle θ1 is determined as an angle larger than 32 degrees, for example, 40 degrees, the length L2 of the light guide member 60 is shortened, and thereby, the length L1 of the fingerprint sensor 20 is shortened. Furthermore, since each optical fiber part 70 is situated within the plane 200, and is inclined in directions X1 or X2 with respect to the Z-axis, the width W2 of the light guide member 60 is shortened to approximately 1 mm. Thereby, the width W1 of the fingerprint sensor 20 is shortened.

FIG. 2B shows a size relation between the optical fiber part 70 and the light receiving element 42, in which the outgoing planes 76 of two optical fiber parts 70 adjacently situated in direction Y1-Y2 are disposed in a manner facing a single light receiving element 42.

The light guide member 60 is adhered to the optical sensor chip 40 with an adhesive layer 100 of an optical adhesive agent. The adhesive layer 100 is formed with a thickness t being thicker than a typical thickness, for example, approximately 50 μm. Here, an adhesive agent, such as a silicone adhesive agent, having a substantial elasticity in a hardened state is employed as the optical adhesive agent. Alternatively, an epoxy adhesive agent may be employed if a substantial elasticity in a hardened state can be attained. The adhesive layer 100 is pressed against and serves to absorb shock when an upper surface of the light guide member 60 abuts an upper die 111, thereby relieving the shock upon the optical sensor chip 40. Furthermore, the adhesive agent 100 also serves to absorb thermal stress during a process where the fingerprint sensor 20 is assembled to an apparatus.

The illumination guide member 80 serves to guide the infrared light from the light emitting diode chips 30-1 to 30-3 toward the upper surface of the fingerprint sensor 20. The illumination guide member 80 is a resin mold member formed of, for example, acrylic resin, polycarbonate resin, or a methacrylic resin, has a satisfactory light transmission property with respect to the wavelength of the infrared light, is elongated in direction X1-X2, and is provided with leg parts 81, 82 on each side thereof (See FIG. 1)

The illumination guide member 80 is disposed in an overstepping manner above the light emitting diode chips 30-1 to 30-3. The leg parts 81,82 abut the interposer 21 and have it height defined thereby. A transparent adhesive layer 101 is adhered to the upper surface of the light emitting diode chips 30-1 to 30-3.

The synthetic resin mold part 90 is made of, for example, epoxy resin, and is integrally formed with the interposer 21. The synthetic resin mold part 90 covers the light emitting diode chips 30-1 to 30-3, the optical sensor chip 40, the condenser chip 50, the resistance element, and the transistor, and surrounds the light guide member 60 and the illumination guide 80. Accordingly, the interposer 21, the light emitting diode chips 30-1 to 30-3, the optical sensor chip 40, the condenser chip 50, the resistance element, the transistor, the light guide member 60 and the illumination guide 80 are integrally formed with the synthetic resin mold part 90.

The upper surface 61 of the light guide member 60 and the upper surface 83 of the illumination guide member 80 are exposed at the upper surface 21 of the fingerprint sensor 21.

A peripheral part of the upper surface of the synthetic resin mold part 90 is formed as a taper inclined surface 91 (see FIG. 8, for example) for easing the sliding of the finger 1.

The periphery of the lower side of the fingerprint sensor 20 includes a flange part 22. This is provided for achieving precise attachment to an apparatus. Furthermore, height H3 from an upper surface 20a of a flange part 22 to the upper surface 20a of the fingerprint sensor 20 is defined by a resin mold die (described below) with satisfactory precision.

A manufacture process of the fingerprint sensor 20 is described with reference to FIGS. 5A-5H.

Figure 5A:
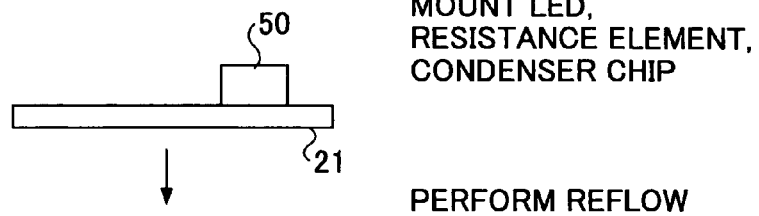
FIGS. 5A-5H is a schematic drawing showing a manufacture process of the fingerprint sensor in FIG. 1.
Figure 5B:
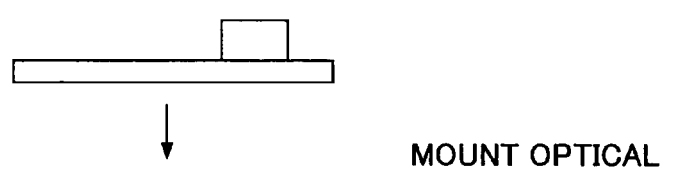
Figure 5C:
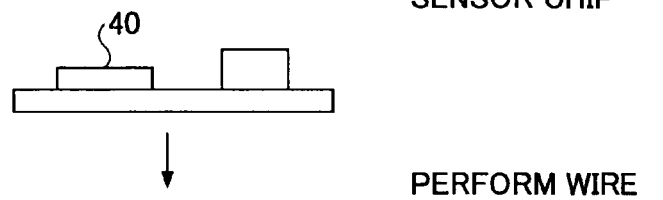
Figure 5D:
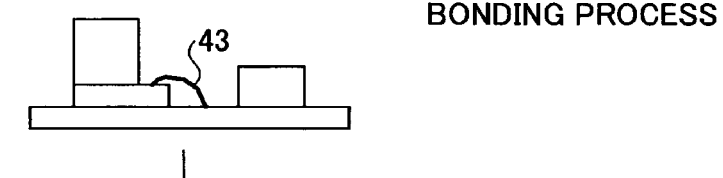
Figure 5E:
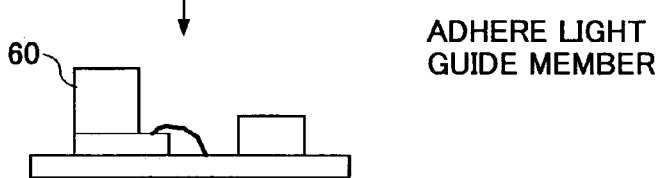
Figure 5F:

In FIG. 5A, the light emitting diode chips 30-1 to 30-3, the condenser chip 50, the resistance element, and the transistor are mounted on the interposer 21. Then, in FIG. 5B, these components are packaged onto the interposer by performing a reflow process thereto. Then, in FIG. 5C, the optical sensor chip 40 is mounted on the interposer 21. Then, in FIG. 5D, the wire 43 is strung between the optical sensor chip 40 and the interposer 21 by performing a wire-bonding process. Next, in FIG. 5E, the light guide member is adhered onto the optical sensor chip 40 by employing an adhesive agent having satisfactory transmission property with respect to illumination light wavelength. Next, in FIG. 5F, the illumination guide member 80 is adhered onto the light emitting diode chips 30-1 to 30-3 by employing an adhesive agent having satisfactory transmission property with respect to illumination light wavelength. The height of the illumination guide member 70 can be defined by abutting the leg parts 81, 82 on each side to the interposer 21 without being affected by the variability of the mounted light emitting diode chips 30-1 to 30-3.

Next, this is set into a lower die 105. The lower die 105 is butted to the upper die 106.

Figure 5G:
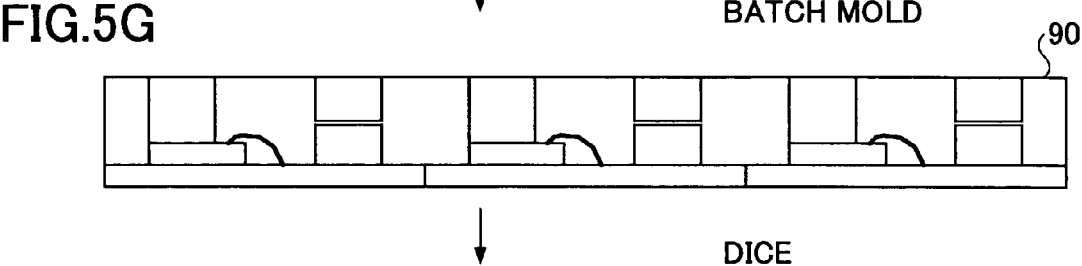
Figure 5H:
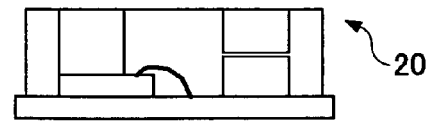
Figure 6:
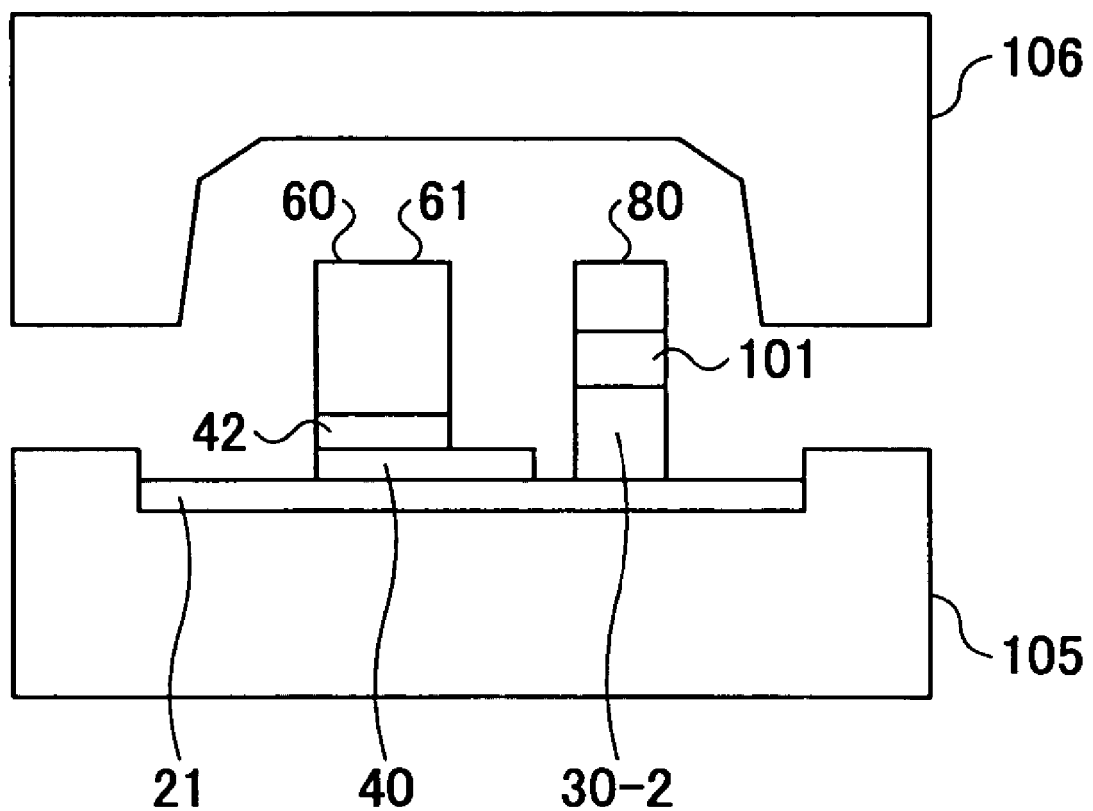
FIG. 6 is a schematic drawing showing a resin molding process in FIG. 5.

Then, resin is poured into the dies, to thereby form the synthetic resin mold part 90. Here, the adhesive layer 100 having a substantial elasticity absorbs the shock when the upper surface 61 of the light guide member 60 abuts an inner surface of the upper die 106, to thereby relieve the shock to the optical sensor chip 40. Furthermore, the height of the upper surface 61 of the light guide member 60 is defined by the lower die 105 and the upper die 106. It is to be noted that the interposer 21 is actually a collective substrate that has plural parts collectively provided to form the interposer 21. FIG. 5G shows the synthetic resin mold parts 90 formed as a collective substrate. In FIG. 5H, the fingerprint sensors 20 are diced and separated. It is to be noted that an annealing process may be suitably performed in a predetermined step to eliminate remaining stress.

It is to be noted that an assembly jig may be employed to define the height of the light guide member 60, and adhere the light guide member 60 onto the optical sensor chip 40. In this case, an optical adhesive agent, including urethane acrylate as a principal component and being cured by irradiation of visible light, is employed. Before curing, the adhesive agent has a viscosity of 11.2 Pa·s. After curing the adhesive agent has a hardness of D44, a coefficient of linear expansion of $175 \times 10^{-6}/°$ C., and a tensile shear strength of 2.1 Mpa.

Figure 7:
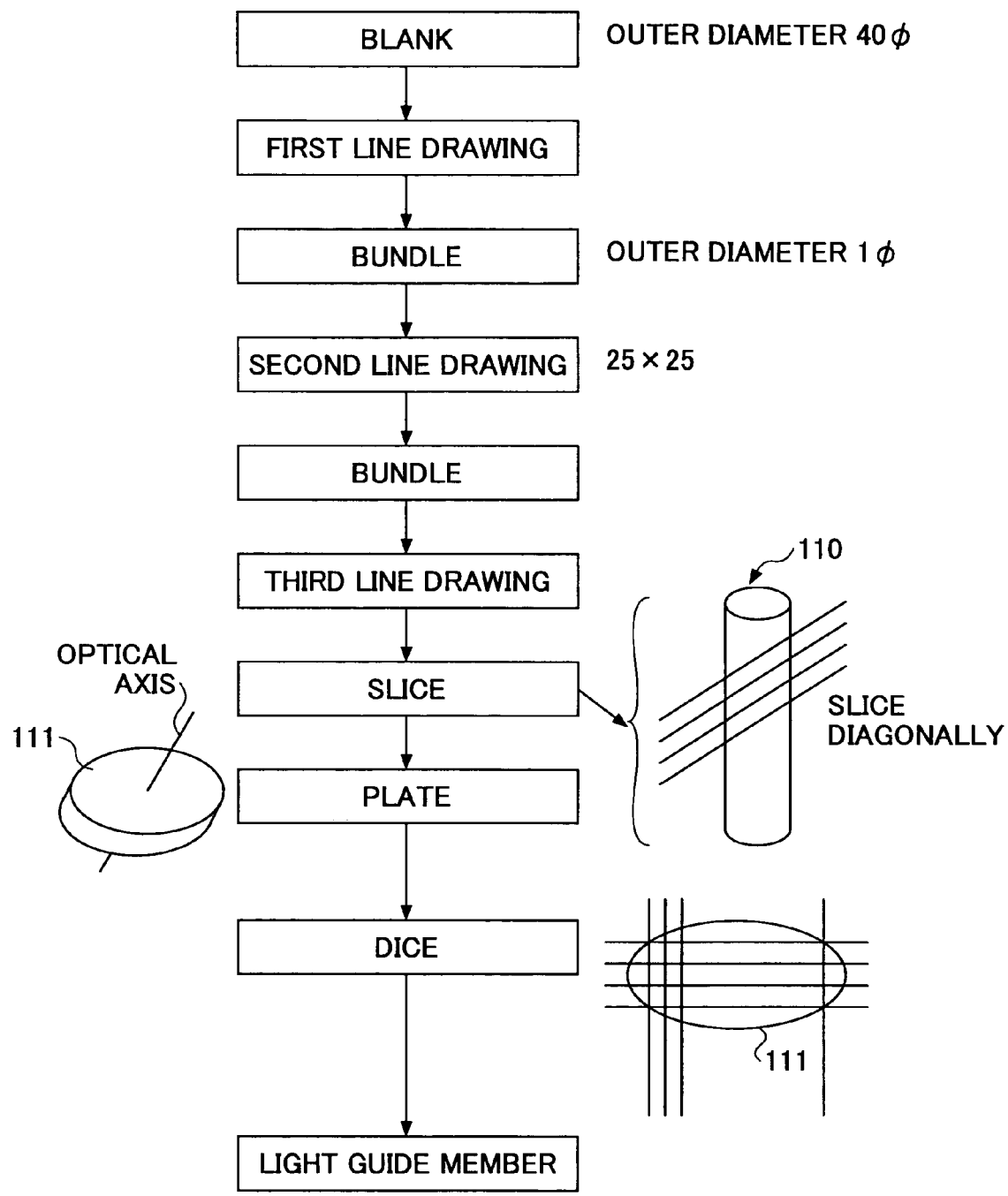
FIG. 7 is a schematic drawing showing a manufacture process of a light guide member.

It is to be noted that the light guide member is formed in a process shown in FIG. 7, for example. This process, first, repeats the steps of: performing a line drawing process using a thick raw blank material, bundling the line drawn material, and performing a line drawing process again, to thereby obtain a bundle 110 having numerous thin optical fibers. The bundle of optical fibers 110 is sliced diagonally, thereby obtaining numerous plates 111 being a bundle of numerous diagonally sliced optical fiber parts. The plates 111 appropriately diced, to thereby obtain the light guide member 60.

Next, the fingerprint sensor 20 is described in a state of attachment and use for a mobile phone.

Figure 8:
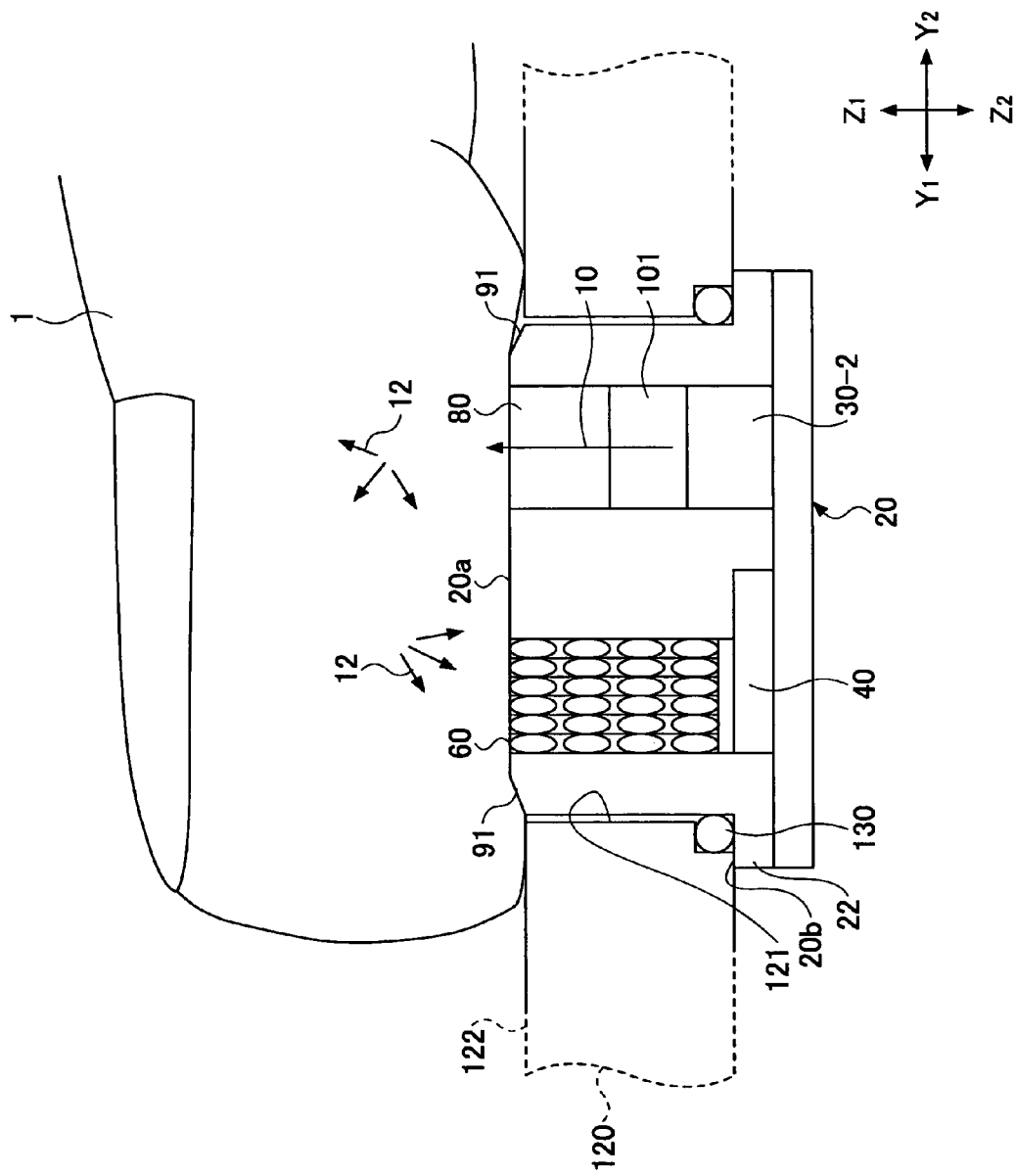
FIG. 8 is a schematic drawing showing the fingerprint sensor of FIG. 1 in a state attached to an apparatus and in a state used for obtaining a fingerprint.

As shown in FIG. 8, the position of the fingerprint sensor 20 is defined at the part of the slits 121 of a casing 120 of a mobile phone with use of the flange part 22, and is assembled in a manner having the upper surface 20a thereof in an exposed state on a surface of the casing 120, and ensuring water-proof property with use of a sealing member 130. Since the flange part 22 serves to define the position and height H3 with satisfactory precision, a high precision can be attained for the position of the upper surface 20a of the fingerprint sensor 20 with respect to an outer surface 122 of the casing 120 of the mobile phone.

In obtaining a fingerprint, as shown in FIG. 8, the finger tip 1 is pressed against the upper surface 20a of the fingerprint sensor 20, and is slid in direction Y1-Y2. The light emitting diode chips 30-1 to 30-3 are lit. Then, light 10 transmits through the adhesive layer 101 and the illumination guide member 90, is emitted from the upper surface 20a of the fingerprint sensor 20, enters the finger tip 1, and is scattered in the tissues of finger tip 1, thereby lighting the finger tip 1.

As shown in FIG. 9, among the internal scattered light emitted from the surface of the finger tip 1 contacting the fingerprint sensor 20, the light 13b emitted from the concave part 1b is absorbed by the light guide member 60, and does not reach the light sensor chip 40. The light 13a emitted from the convex part 1a is totally reflected inside the light guide member 60, and reaches the light receiving element 42 of the optical sensor chip 40. Then, information from the optical sensor chip 40 is processed, to thereby obtain linear fingerprint information of the portion of the finger tip 1 contacting the light guide member 60. As the finger tip 1 is slid, the portion contacting the light guide member 60 moves toward a front side, thereby the linear fingerprint information from the movement is combined to obtain fingerprint information on the surface of the finger tip 1.

Since the periphery part of the fingerprint sensor 20 includes the taper inclined surface 91, the finger tip 1 can be smoothly slid without being caught at a rim part of the upper surface 20a of the fingerprint sensor 20.

Figure 10:
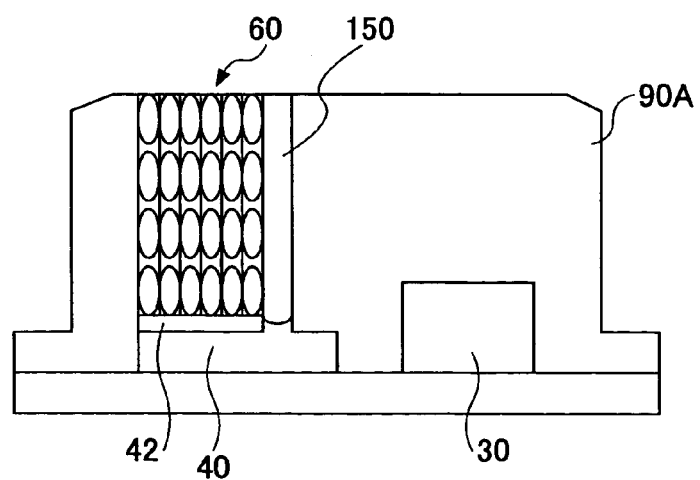
FIG. 10 is a cross-sectional view showing a fingerprint sensor according to a second embodiment of the present invention.
Figure 11A:
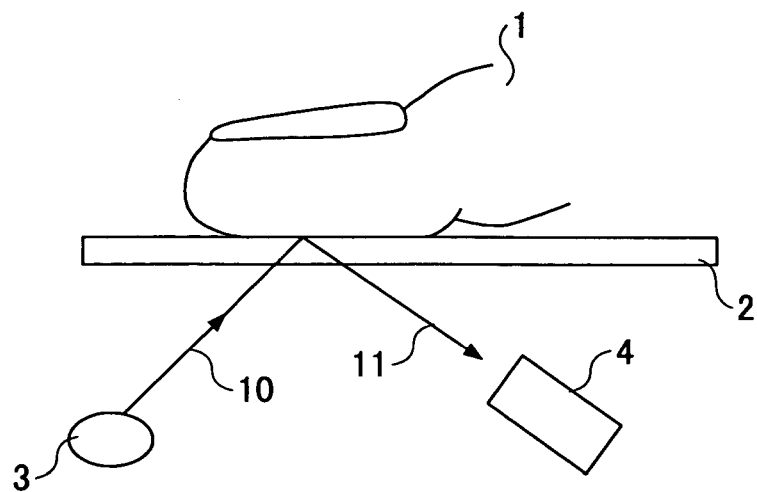
FIGS. 11A-11B are drawings for explaining the types of fingerprint sensors.
Figure 11B:
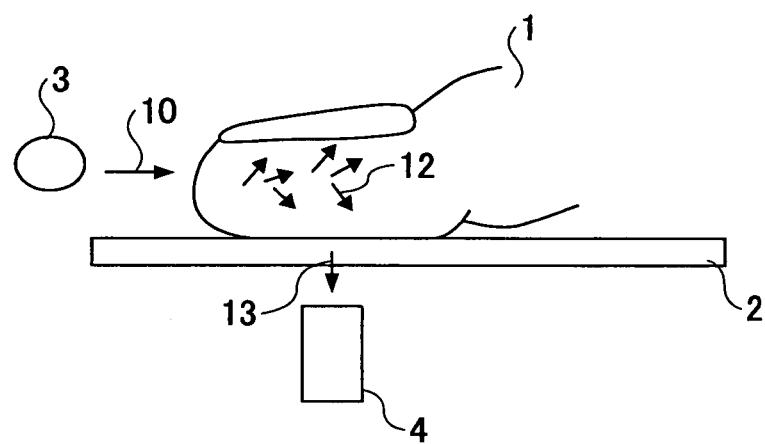

FIG. 10 shows another sensor 20A according to a second embodiment of the present invention. Here, a synthetic resin mold part 90A, having a satisfactory light transmitting property with respect to illumination wavelength, is not provided with the illumination guide member 90, but has a light blocking member 150 disposed at a side of the light emitting diode chips 30-1 to 30-3 of the light guide member 60.

It is to be noted that the foregoing embodiments of employing the synthetic resin mold part 90, 90A in forming an integrated body may be applied to an area type optical sensor chip having light receiving elements aligned in a matrix form, and may be applied to a light guide member having a section with a size corresponding to a finger tip.

Hence, with the present invention including an illumination light emitting element and an optical sensor chip mounted on an interposer, including a light guide member mounted on the optical sensor chip, and integrally encasing the illumination light emitting element, the optical sensor chip, and the light guide member with a synthetic resin mold part, a type of fingerprint sensor using internal scattered light can be downsized, and can be applied to small sized apparatuses such as a mobile phone. Furthermore, with the present invention, precision in positioning the illumination light emitting element, the optical sensor chip, and the light guide member can be increased. Thereby, the fluctuation in the fingerprint obtaining property can be reduced, and little or no adjustment may be required upon attachment to an apparatus. Therefore, attachment to an apparatus can be simplified. Furthermore, the degree of freedom of the design of the apparatus can be improved since the fingerprint sensor is formed as a single module.

Further, the present invention is not limited to these embodiments, but various variations and modifications may be made without departing from the scope of the present invention.

The present application is based on Japanese Priority Application No. 2004-008501 filed on Jan. 15, 2004, with the Japanese Patent Office, the entire contents of which are hereby incorporated by reference.

What is claimed is:

1. An image detection apparatus comprising:
   an interposer;
   an illumination light emitting element mounted on the interposer for emitting a light toward a surface of a finger tip;
   an optical sensor chip mounted on the interposer, the optical sensor chip including an alignment of light receiving elements;
   a light guide member including a bundle of optical fiber parts, the light guide member being mounted on the optical sensor chip, the light guide member including a contact surface to which the surface of the finger tip is contacted, the contact surface being situated opposite from a surface to which the optical sensor chip is mounted; and
   a synthetic resin mold part being integrally formed with the interposer, the synthetic resin mold part covering the illumination light emitting element and the optical sensor chip and surrounding the light guide member;
   wherein an inclination angle of the optical fiber parts and a length of the light guide member satisfy a relation in which the length of the light guide member becomes shorter as the inclination angle of the optical fiber parts becomes larger;
   wherein the light guide member is mounted on the optical sensor chip at an inclination angle that ranges from 32 degrees to 48 degrees; and
   wherein the light guide member is adhered to the optical sensor chip via an adhesive layer having a thickness of approximately 50 μm; and
   wherein the adhesive layer has both a shock absorbing property and a thermal stress absorbing property.

2. The image detection apparatus as claimed in claim 1, wherein the synthetic resin mold part has a light blocking property.

3. The image detection apparatus as claimed in claim 1, further comprising an illumination guide member disposed above the illumination light emitting element for guiding the emitted light to the finger tip.

4. The image detection apparatus as claimed in claim 3, wherein the illumination guide member is formed of a material having a satisfactory light transmitting property with respect to a wavelength of the emitted light of the illumination light emitting element.

5. The image detection apparatus as claimed in claim 1. wherein the interposer includes a flange part formed at a peripheral part thereof.

6. The image detection apparatus as claimed in claim 1, wherein the light receiving elements of the optical sensor chip are aligned as a straight line, wherein the illumination light emitting element is disposed in correspondence with the alignment of the light receiving elements.

7. The image detection apparatus as claimed in claim 1, wherein the synthetic resin mold part includes an inclined plane formed at a peripheral part thereof.

* * * * *